United States Patent
Zhu et al.

(10) Patent No.: US 8,781,162 B2
(45) Date of Patent: Jul. 15, 2014

(54) METHOD AND SYSTEM FOR HEAD TRACKING AND POSE ESTIMATION

(75) Inventors: Youding Zhu, Sunnyvale, CA (US);
Charles Musick, Jr., Belmont, CA (US);
Robert Kay, San Francisco, CA (US);
William Robert Powers, III, San Francisco, CA (US); Dana Wilkinson, Mountain View, CA (US); Stuart Reynolds, Mountain View, CA (US)

(73) Assignee: AiLive Inc., Sunnyvale, CA (US)

(*) Notice: Subject to any disclaimer, the term of this patent is extended or adjusted under 35 U.S.C. 154(b) by 805 days.

(21) Appl. No.: 12/984,606

(22) Filed: Jan. 5, 2011

(65) Prior Publication Data
US 2012/0169887 A1 Jul. 5, 2012

(51) Int. Cl.
*G06K 9/00* (2006.01)
*G06T 7/00* (2006.01)
*G06K 9/32* (2006.01)

(52) U.S. Cl.
CPC ..... *G06T 7/0046* (2013.01); *G06T 2207/10016* (2013.01); *G06K 2009/3291* (2013.01); *G06T 2207/30201* (2013.01); *G06K 9/00261* (2013.01)
USPC ........... 382/103; 382/106; 382/107; 382/181; 382/190; 348/77; 348/169

(58) Field of Classification Search
None
See application file for complete search history.

(56) References Cited

U.S. PATENT DOCUMENTS

| | | | |
|---|---|---|---|
| 6,111,517 A * | 8/2000 | Atick et al. .................. 340/5.83 |
| 2003/0235341 A1 * | 12/2003 | Gokturk et al. .............. 382/243 |
| 2004/0220769 A1 * | 11/2004 | Rui et al. ...................... 702/179 |
| 2005/0059488 A1 * | 3/2005 | Larsen et al. .................. 463/36 |
| 2005/0110637 A1 * | 5/2005 | Rao ............................... 340/541 |
| 2006/0146046 A1 * | 7/2006 | Longhurst et al. ............ 345/418 |
| 2009/0034801 A1 * | 2/2009 | Hammoud .................... 382/107 |
| 2010/0253492 A1 * | 10/2010 | Seder et al. ................... 340/435 |
| 2010/0253493 A1 * | 10/2010 | Szczerba et al. .............. 340/435 |
| 2010/0253543 A1 * | 10/2010 | Szczerba et al. ............. 340/932.2 |
| 2010/0316298 A1 * | 12/2010 | Swaminathan et al. ...... 382/209 |
| 2011/0026770 A1 * | 2/2011 | Brookshire ................... 382/103 |

OTHER PUBLICATIONS

Palleja et al. "Using the Optical Flow to Implement a Relative Virtual Mouse Controlled by Head Movements", 2008, Journal of Universal Computer Science, vol. 14, No. 19.*
He et al. "Surf Tracking" 2009, IEEE 12th International Conference on Computer Vision (ICCV), pp. 1586-1592.*

* cited by examiner

*Primary Examiner* — Matthew Bella
*Assistant Examiner* — Jason Heidemann
(74) *Attorney, Agent, or Firm* — Joe Zheng

(57) ABSTRACT

Techniques for performing accurate and automatic head pose estimation are disclosed. According to one aspect of the techniques, head pose estimation is integrated with a scale-invariant head tracking method along with facial features detected from a located head in images. Thus the head pose estimation works efficiently even when there are large translational movements resulting from the head motion. Various computation techniques are used to optimize the process of estimation so that the head pose estimation can be applied to control one or more objects in a virtual environment and virtual character gaze control.

34 Claims, 5 Drawing Sheets

METHOD AND SYSTEM FOR HEAD TRACKING AND POSE ESTIMATION

BACKGROUND OF THE INVENTION

1. Field of the Invention

The invention is generally related to the area of artificial intelligence, and more particularly, related to computer vision, especially in the context of markerless head pose estimation and tracking from monocular video sequences captured by an imaging device (e.g., a video camera).

2. Related Art

In computer vision, head pose estimation is a process of inferring the orientation and position of a human head from digital imagery [1]. More exactly, for monocular passive optical camera based applications, it is about the estimation of the head motion in six degrees of freedom relative to a still camera, where the six degrees of freedom include three degrees of freedom for rotating along the three axes and three degrees of freedom for translating along the three axes.

Although people can interpret the head orientation and movement easily, head pose estimation is still remained as one of the challenging problems in computer vision due to the fact that the final pixel-based facial image is largely affected by various factors including camera geometric distortion, perspective camera projection, and varying illumination.

Error accumulation in pose estimation is another major concern during incremental pose tracking. A large number of existing head pose estimation approaches are based on estimating the incremental head motion between two successive video frames. In these incremental estimation approaches, error accumulation degrades the estimation accuracy to the point that the final pose estimation becomes unusable.

Two latest approaches [2, 3] show some promising results for head pose estimation in real-time and under certain assumptions. Morency et al [2] use an iterative normal flow constraint to estimate the pose differences between a current frame and key-frames (including the last frame) that are collected in an online manner. Jang et al [3] use the feature point (including SIFT and regularly sampled facial image points) registration to estimate the pose differences between the current frame and key frames (including the last frame) that are also collected in an online manner. However, pose estimation results by Morency et al and Jang et al are sensitive to large translation motion due to the local optimization of the normal flow based computation and feature point registration. Consequently, both are not appropriate for interactive game applications, where the head of a user could have fast or large translation movements.

Thus there is a great need for pose estimation that would overcome the issues demonstrated in Morency et al or Jang et al. Further, such solutions would be efficient enough for interactive applications (e.g., games), requiring no intervention from a user(s) or no special constraints on the user(s).

SUMMARY OF INVENTION

This section summarizes some aspects of the present invention and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Generally speaking, the present invention pertains to techniques for head pose estimation. Besides being applicable in many interactive applications, some embodiments of the techniques are particularly useful in interactive games, where some controls or interactions may be achieved by movements of a head of a player. According to one aspect of the present invention, a user wears no markers and performs motions in front of a camera. An image sequence is captured. Object detection and tracking techniques are designed to automatically detect and track the head of the user from the captured image sequence in an online manner. According to another aspect of the present invention, a 3D head model is used to represent an observed head, and its pose is further estimated based on the tracked facial feature points using non-linear optimization. Unlike the head pose estimation methods in the art, one embodiment of the head pose estimation techniques works advantageously even when the head has made fast and large translational movements, in which facial feature tracking is integrated with a scale-invariant head tracker running in real-time. The estimated head pose can be used to generate control signals that could be used by various game applications including virtual camera control and virtual character gaze control.

According to still another aspect of the present invention, a scale-invariant object descriptor is designed to track the head position and size in real-time. This scale-invariant head tracker is integrated with a generic head detector trained with a machine learning algorithm such as AdaBoost algorithm. The head detector is used to initialize the head position and size for the head tracker, but it could also be used to reinitialize the head tracker.

According to still another aspect of the present invention, facial feature points, including eyes, noses, and mouth corners, are detected inside a tracked head region. The facial feature points are used to estimate the frontal head poses given a generic 3D head model.

According to still another aspect of the present invention, the model-based head pose estimation performs incremental head pose estimation based on either the optical flow constraints from a set of sparse image corners localized inside the tracked head region, or the matched reference frame indexed by SURF features. Both of the head pose estimation results are integrated together using the Kalman filter with covariance derived from the sum of squared residual errors. More importantly, unlike the existing head pose estimation methods, the head pose estimation disclosed herein works well under fast and large translation motions as the facial feature tracking is integrated with a scale-invariant head tracker running robustly in real-time.

According to yet another aspect of the present invention, the tracked head positions are applied to control the positions of a 2D camera, where the movement of the head in the image plane is mapped to the movement of the camera. Similarly, the tracked 3D head poses may be applied to control the positions and orientations of a 3D camera, as well as the gazes of a virtual character.

The present invention may be implemented in different forms including a method, a system, a device or a software product. Different forms of the embodiments of the present invention may yield different results. According to one embodiment, the present is a method for determining motion of a head, the method comprises: generating a sequence of images from a camera looking at a user; estimating a position and a size of a head of the user in each of the images using a scale-invariant head tracking technique; and determining pose of the head from the position and size of the head. The estimating of the position and the size of the head in each of the images using the scale-invariant head tracking technique comprises: tracking in each of the images whether there is a head or not; defining a region of interest when the head is detected in the each of the images; and locating the position of the head and measuring the size thereof in the region of interest. The tracking in each of the images is capable of tracking the head under partial occlusion; tracking the head with surrounding other heads without being distracted; or tracking a temporarily occluded head.

According to another embodiment, the present invention is a device for determining motion of a head. The device comprises an interface, coupled to a camera, to receive a sequence of images from the camera disposed to look at a user, a memory space for storing code, a processor, coupled to the memory space, executing the code to perform operations of: estimating a position and a size of a head of the user in each of the images using a scale-invariant head tracking technique designed to scan the each of the images at all scales; and determining pose of the head from the position and size of the head.

Other objects, features, benefits and advantages, together with the foregoing, are attained in the exercise of the invention in the following description and resulting in the embodiment illustrated in the accompanying drawings.

REFERENCES

The foregoing BACKGROUND OF THE INVENTION cites the following references which are hereby incorporated by reference.
1. E. Murphy-Chutorian and M. M. Trivedi. Head pose estimating in computer vision: A survey. IEEE Transaction on Pattern Analysis and Machine Intelligence, 31(4):607-626, 2009;
2. L.-P. Morency, J. Whitehill, and J. Movellan. Generalized adaptive view-based appearance model: Integrated framework for monocular head pose estimation. 8th International Conference on Automatic Face and Gesture Recognition (FG2008), pages 1-8, 2008; and
3. J.-S. Jang and T. Kanade. Robust 3d head tracking by online feature registration. 8th International Conference on Automatic Face and Gesture Recognition (FG 2008), 2008.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
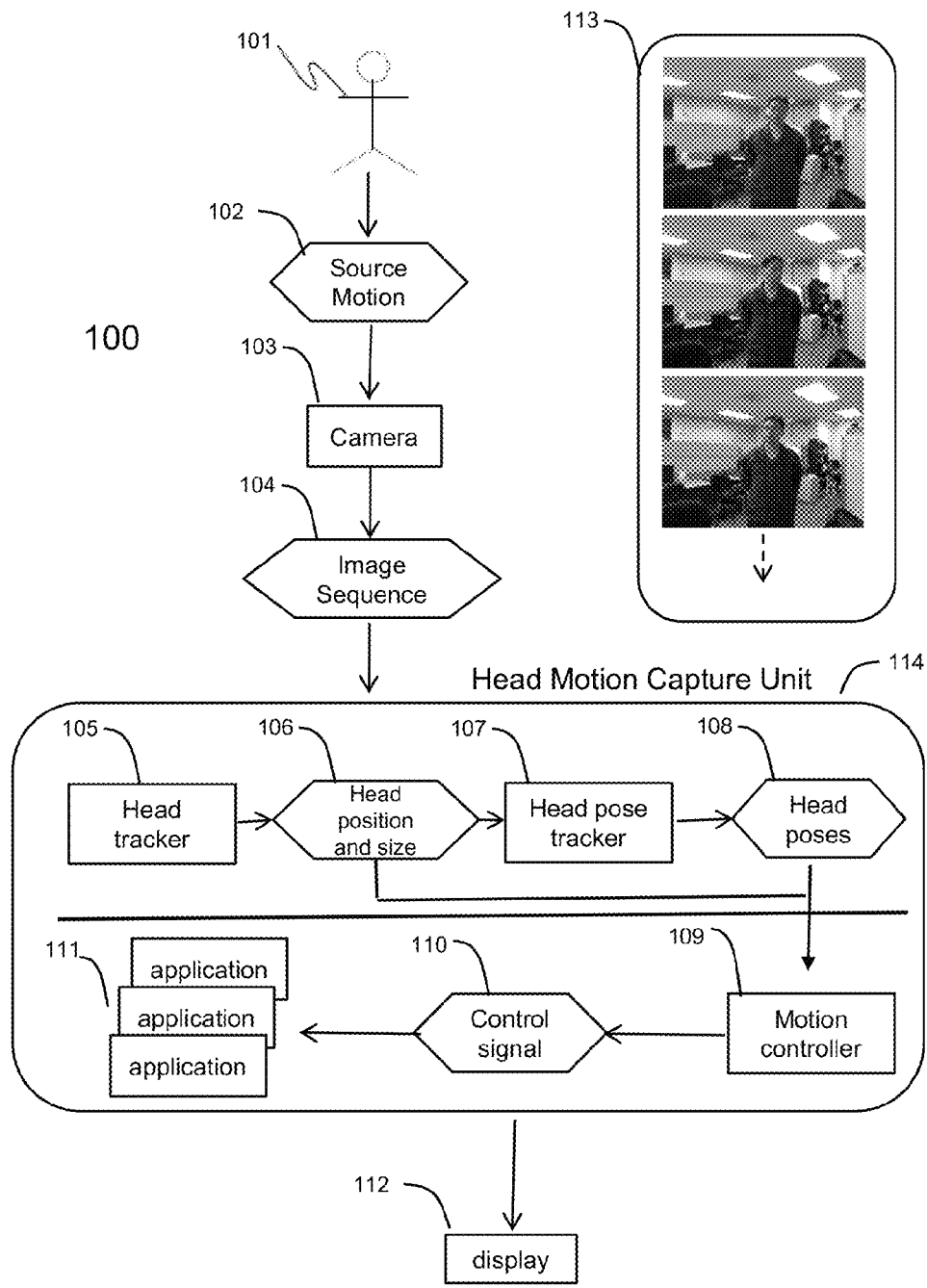
FIG. 1 shows an exemplary configuration of pose estimation of a head according to one embodiment of the invention.

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art.

Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

For convenience, definitions for some terms are provided below. It should be noted that the definitions are to facilitate the understanding and description of the invention according to one embodiment. The definitions may appear to include limitations with respect to the embodiment. However, the actual meaning of the terms may have applicability beyond such an embodiment.

Image sequence: a sequence of images captured by a camera either in online or offline manner.

Head detector: an image based detector configured to localize some or all of a head inside an image.

Scale-invariant: in image processing and computer vision, a process is scale-invariant if it works appropriately for images at multiple scales. Besides the normal meaning, in one embodiment, a scale means a size of a head in an image, the sizes of a head in a sequence of images may change from one image to another, a process involved in head pose estimation herein that is scale-variant means it works for all sizes of the head in the images.

Head tracker: a monocular video-based head position and scale tracker module configured to perform an integrated work of both head detection and scale-invariant head tracking.

Facial features: a set of frontal facial features including left eye, right eye, nose, left mouth corner, and right mouth corner.

Head pose: a 3D head pose associated with a 3D head model including both position and orientation information.

Head pose tracker: a monocular video-based head pose estimation and tracking module configured to perform automatic pose initialization with localized frontal facial features and pose tracking with generic image features by minimizing the sum of squared distances between the image features and the corresponding projected features obtained from a 3D head model.

Motion controller: a mapping scheme or module configured to map 2D head tracking results or 3D head poses to control signals to perform interactive control of various applications (e.g., a video game).

Global head detector: a head detector or module configured to scan a whole image across multiple scales, and detects all of potential heads in the image.

Local head detector: a head detector or module configured to scan a local image region, e.g. an enlarged region including a tracked head, across two most likely scales based on a tracked head size from a last frame, and detects all of potential heads within the local image region.

Head appearance descriptor: a scale-invariant head appearance description appropriate for performing efficient similarity computation for local head searching.

Local head searcher: a module configured to find the local optimal head position and size using similarities computed from a head appearance template generated at an initialization stage and head appearance descriptors generated from head hypotheses inside a local image region, e.g. an enlarged tracked head region.

3D head model: a generic head model represented by a set of 3D triangles whose coordinates are defined in the head local coordinate reference frames.

Reference frame: a head pose reference frame includes head pose and its SURF features.

SURF: stands for "Speeded Up Robust Features", which is a feature extraction method known in computer vision.

KLT: stands for the "Kanade-Lucas-Tomasi Feature Tracker", which is an image-based feature tracking method known in computer vision.

Referring now to the drawings, in which like numerals refer to like parts throughout the several views. FIG. 1 shows one exemplary configuration 100 according to an embodiment of the invention. The configuration 100 includes a display 112, a camera 103 and a processing unit, also referred to as a head motion capture unit 114. In operation, the camera 103 captures images that are transported to the head motion capture unit 114 for analysis (e.g., to determine the pose of one or more heads in the images). The display 112 is driven by the head motion capture unit 114.

A user 101 is a typical end user that performs some source motion 102, and is captured by the camera 103 that generates an image sequence 104. As used in the drawings herein, an irregular hexagon means a space for holding a type of signal (s). Depending on implementation, the space may be a readable medium or a representation of a signal or a source thereof. For example, a user makes some movements in interacting with a video game to control a virtual object or react to a surrounding in a virtual environment. The movements are considered as a source motion 102 in FIG. 1. Similarly, an image sequence produced from a camera is represented as an image sequence 104 in FIG. 1, where the image or data thereof is being transported to the head motion capture unit 114 via a type of medium.

One of the advantages, objects and benefits of this invention is to provide a free-form, natural head pose-based control interface, without using any marker or wearing any special device, for one or more of applications 111 to be executed in the head motion capture unit 114. The source motion 102 in this embodiment is the natural motion performed by the user 101 through his or her head movements in six degrees of freedom including three degrees of freedom head translation and three degrees of freedom head rotation.

The camera 103 is an image capture device, e.g., a PlayStation Eye webcam, to capture the motion of an end user as an image sequence 104. It should be noted that there is no need to require a depth camera in this embodiment. The image sequence 104 is a collection of image frames capturing the source motion. An exemplary image sequence 113 is captured from a source motion for a head yaw movement. The image sequence 113 shows that a head has a neutral pose in the top of the image while the head rotates to the left, and the head rotates to the right in the two bottom images.

A head tracker 105 is a module residing in the head motion capture unit 114. It is configured to generate tracked head position and size 106 in an image plane based on scale-invariant head tracking techniques to be detailed below. The head position and size 106 are the tracked head information in an image plane. The tracked head is represented as an oriented rectangle, where the height and width of the oriented rectangle represent the head size information in the image plane, and a roll angle of the oriented rectangle represents the head orientation in the image plane.

The head pose tracker 107 is a model-based pose estimation module configured to estimate the head poses 108. In one embodiment, the head pose tracker 107 operates based on the non-linear optimization to minimize the sum of squared distances between the tracked facial features and projected corresponding features obtained from a 3D head model. The analytical Jacobian computation is utilized to speed up the non-linear optimization with second-order Gaussian-Newton method, and use the residual errors to confirm the convergence of the optimization.

The head poses 108 generated from the head pose tracker 107 are the estimated 3D position and orientation information for the tracked head. Through the head poses 108, the source motion 102 performed by the end user 101 can be transformed into a representation appropriate for a motion controller 109 to generate a motion control signal 110. In one embodiment, a control signal 110 encodes the information for interacting with one or more virtual objects in a game application, such as camera movement, or virtual character gaze.

Figure 2:
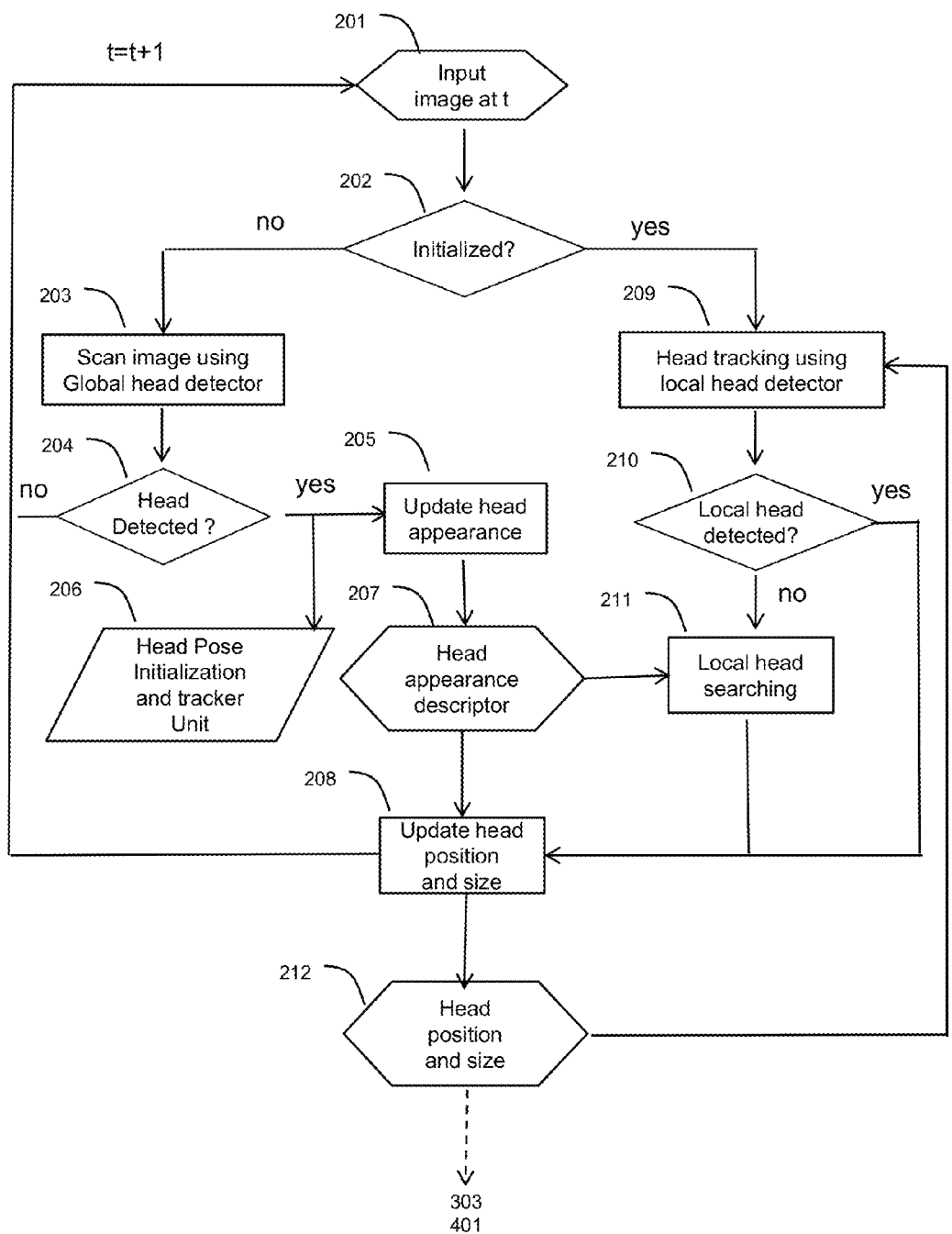
FIG. 2 shows a process or flowchart to show exemplary head tracking according to one embodiment of the present invention.

FIG. 2 shows a process or flowchart 200 to show exemplary head tracking for the head tracker module 105, according to one embodiment of the present invention. The process 200 may be implemented in software, hardware or in combination of both so that it can track, in an online manner, the head position and size of a user in an image. Some advantages, benefits and objects of the head track module 105 include: (1) it can track a head under partial occlusion, e.g., a head is partially occluded by something (e.g., a hand); (2) it can successfully track a head with surrounding other heads without being distracted; (3) it can successfully track a temporarily occluded head; (4) a head descriptor is scale-invariant so that efficient multi-scale searching can be performed without degrading the tracking results.

According to one embodiment, the head tracking process 200 includes two stages. The first stage is to perform automatic head tracker initialization using a global head detector at 203. The second stage is to perform automatic head tracking for the detected head with a local head detector at 209 followed by local head searching at 211.

At 201, a sequence of images is being received (e.g., from an image capturing device). Each of the images is sequentially processed. It is assumed that an image frame captured at t is time-stamped with t and is initially started. A test is carried out to decide whether the head tracking process 200 has been initialized at 202 with a head region residing in the image at 202. If the head tracker has not been initialized, the process 200 goes to 203 to start scanning the image using what is called herein a global head detector. The global head detector is configured to scan the image at 204 at multiple scales in one embodiment. The global head detector is configured to scan across a whole image to find any head in the image. If there is no any detection of one or more heads in the image, the process 200 moves from 204 to 201 for a next image frame, resulting in an increment to the time stamp t+1.

If there is a detection of one or more heads from the image at 204, the initialization stage ends. The process 200 goes to 205 to initiate or update a scale-invariant head descriptor for the image, wherein the detection result is expressed at 207. Subsequently, the process 200 starts a local head searching at 211.

The global head detector used at 203 may be implemented to detect all heads residing in the image at all of scales and positions. According to one embodiment, the global head detector may be trained with an adaptive boosting algorithm (e.g., a machine learning algorithm) or other related techniques to be more efficient at determining if there is a head in an image. The scale-invariant head descriptor and tracker, as further detailed below, is not limited to working with a particular head detector.

The scale-invariant head descriptor has several distinguishable features that make a head tracker appropriate for game applications. Firstly, the descriptor is defined as a composite feature vector formed from an 8×8×8 color histogram, where each color channel is quantized into 8 bins, and from a 4×4×8 gradient histogram where the head image is quantized into 4×4 spatial cells and 8 gradient orientations. Both the color histogram and the gradient histogram are scale invariant, and thus the descriptor is optimal for efficient multi-scale searching during tracking. For interactive game applications, such multi-scale searching is a very important feature to successfully track a fast moving head in an image.

Secondly, the color histogram is able to make a head distinct from background, and it is robust toward partial occlusion. A gradient histogram is able to remember the appearance information that is special to the tracked person, which makes it robust toward surrounding distracting heads and temporary occlusion. The similarity between two scale-invariant descriptors is defined as weighted summation of normalized correlations for the color histogram and for the gradient histogram. A composite feature vector formed from the color and gradient histograms, along with the weighted similarity criteria, makes it robust under partial occlusion, temporary occlusion, and surrounding distracting heads. The weights for similarity from the color histogram and similarity from the gradient histogram are determined automatically based on the robustness of the tracker under partial and temporary occlusion.

After the initialization at 202 is finished, the process 200 starts the tracking stage. At each of the tracking stage, a region of interest (ROI) is defined as an area occupied by a detected head from 204. Typically, the ROI is larger than the detected head but much smaller than the original image in size. A local head detector 209 is configured to scan this region of interest at two scales based on the tracked head size from the last time stamp. If any local head is detected as decided in 210, the tracked head position and size are updated at 212. Otherwise, a local head searcher is configured to continue to search a local head inside the region of interest at 211. The optimal head position and scale, which has the maximal similarity, is used to update the head position and size 208. The tracked head position and size information 212 is exported to other computational unit at 212, e.g., a module 303 of FIG. 3 and a module 401 of FIG. 4, which will be described below.

The local head searcher 211 takes advantage of the scale-invariant property of the head descriptor described herein. Instead of searching all of the head positions in the region of interest with small incremental steps, a local head searcher is configured to scan the region of interest in large steps at a coarse scale, and finds the optimal tracked head position and size defined as R1. It then scans a narrowed region of interest, which surrounds R1, in medium steps at a medium scale, and finds the optimal tracked head position and size defined as R2. Finally it scans a region of interest, which surrounds R2, in small steps at a small scale.

According to one embodiment, the head tracker unit 200 generates some important information including the tracked head position and size from 212 and the head detection status from 204 and 210. Further, it also provides signals to a head pose initialization unit 206 corresponding to 300 of FIG. 3, and a head pose tracker unit 400 of FIG. 4 when an initial head is detected by a global head detector at 203.

Figure 5A:
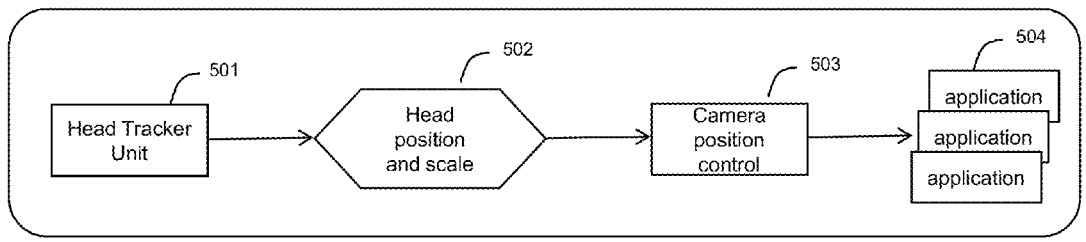
FIG. 5A shows a functional diagram in which a scale-invariance head tracker is used in conjunction with one or more applications.

One of the features, advantages and benefits in the invention is to provide a capability to track fast and large head movement effectively through the head tracker 200. This capability allows a user to create a natural and intuitive motion control interface for various game applications as shown in FIG. 5A. Furthermore, both head pose initialization unit 300 and head pose tracker unit 400 take advantage of this capability to realize a robust 3D head pose estimation system which is otherwise impossible and could be error-prone as in the existing head pose estimation approaches.

Figure 3:
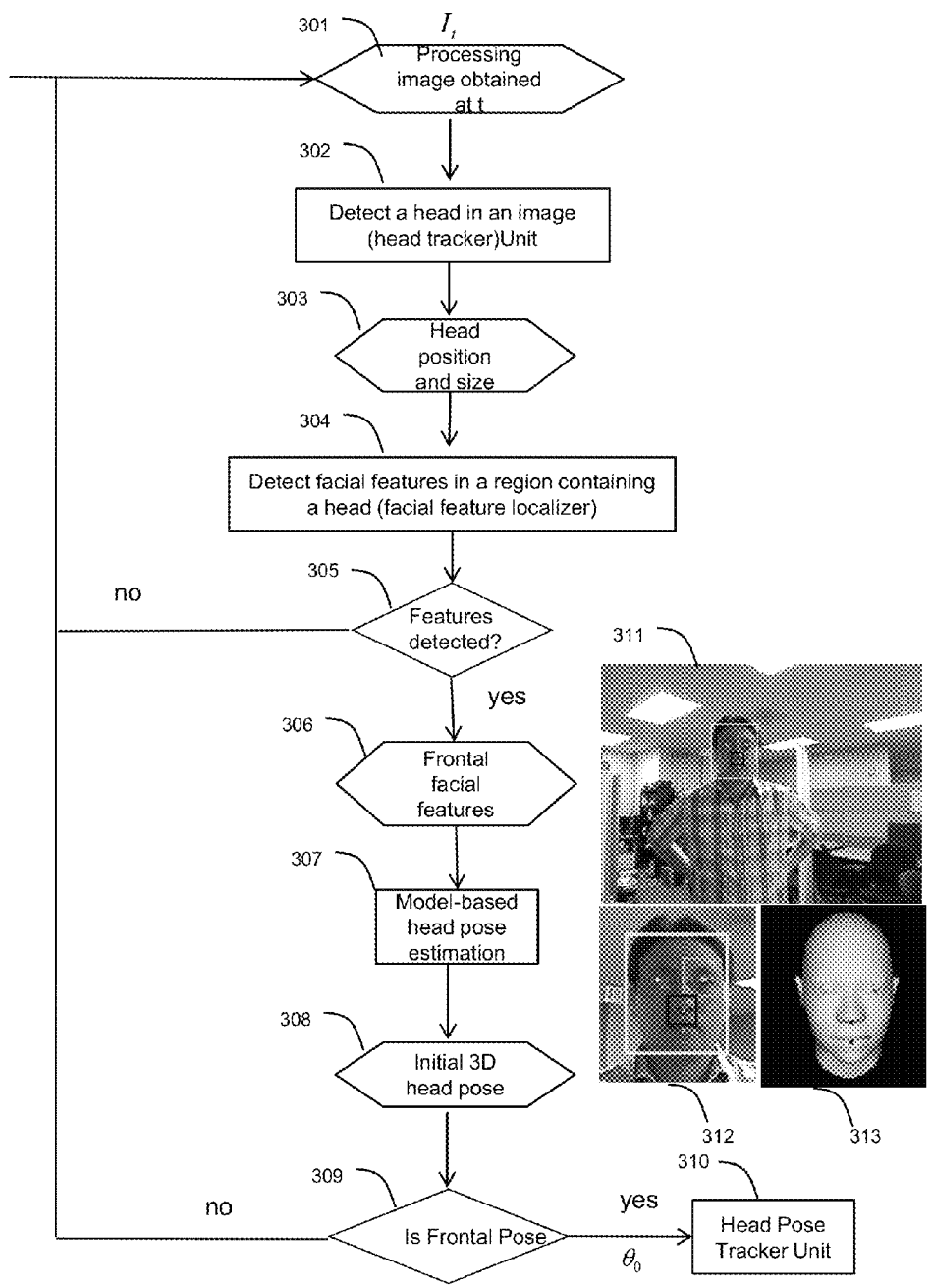
FIG. 3 shows a flowchart or process that may be implemented in a 3D head pose initialization unit.

FIG. 3 shows a flowchart or process 300 that may be implemented in a 3D head pose initialization unit. The process 300 is a fully automatic process to localize, from the tracked head information in FIG. 2, frontal facial features including eye centers, nose, and mouth corners, and subsequently estimate the initial 3D head pose. Depending on implementation, the process 300 may be implemented in software, hardware or in combination of both. According to one embodiment, an image frame is processed at 301. To facilitate the description of the process 300, similar to 201 of FIG. 2, it is assumed that the time the image was taken is at t.

Thus, given the input image at time stamp t, a head tracker unit is configured to detect if there is a head in the image at 302. If the image is detected to include a head, it measures the head position and size and generates an initial head detection status. The position and size are shown at 303 and may be updated with the head position and size information obtained for each of the images from a camera.

Similar to FIG. 2, a number of facial features is located or determined in a region of interest containing the detected head. According to one embodiment, a facial feature localizer or module is configured to scan a set of predicted positions for the facial features including eye centers, nose, and mouth corners, inside the region obtained from the head tracking at 302. It further decides whether these facial features are detected based on a generic pattern analysis and detection technique.

If the facial feature localizer cannot detect these pre-specified facial feature points in the tracked head region at 305, the process 300 goes back to 301 to wait for a next image from the camera. If the facial feature localizer does detect these pre-specified facial feature points at 305 in the tracked head region, wherein these facial features are shown at 306. A model-based pose estimation module is configured to estimate the 3D head pose at 307.

An inserted photo 311 shows exemplary pre-specified facial feature points. A generic 3D head model is provided and shown in an inserted photo 313, where a set of model vertices corresponding to the facial features at 306 detected from the image including eyes, nose, and mouth corners is superimposed on the generic 3D head model as shown in an inserted photo 313.

Given both the detected facial features and their corresponding head model vertices, the model-based head pose estimation at 307 is a non-linear optimization process which is to minimize the sum of squared distances between the detected facial features and projected head model vertices.

For interactive game applications which require real-time head pose estimation in an online manner, it is important to have a computationally efficient non-linear optimization process. According to one embodiment, the analytical Jacobian with Gaussian-Newton iteration which has a second order convergence rate is utilized, and it converges pretty fast to satisfy the real-time requirement for most interactive game applications using the model-based head pose estimation.

In one embodiment, the model-based head pose estimation method converges in about 10 iterations, and the feature point residual errors are less than 2 pixels. Otherwise, the estimation result would be rejected. At 309, the estimation results need to be confirmed to be indeed on the face. In one embodiment, the confirmation is performed by confirming that estimated 3D head model is looking forward so as to remove any possible large estimation errors. The process 300 terminates after successfully localizing the fontal facial features and estimating a frontal head pose.

Figure 4:
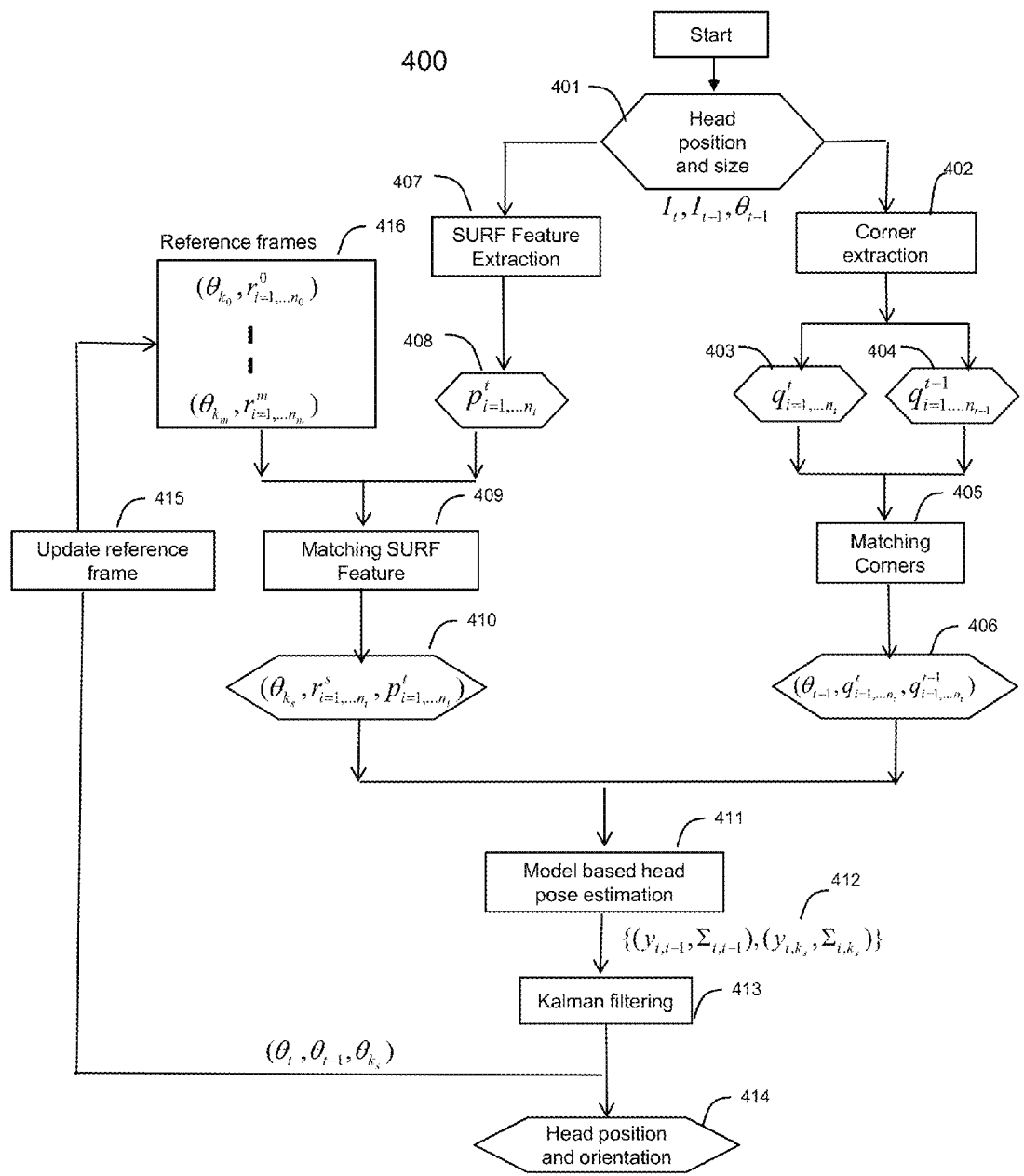
FIG. 4 shows a flowchart or process for operations in a head pose tracker unit configured to perform 3D head pose tracking.

FIG. 4 shows a flowchart or process 400 for operations in a head pose tracker unit configured to perform 3D head pose tracking. Depending on implementation, the process 400 may be implemented in software, hardware or in combination of both. According to one embodiment, some of the features, benefits or advantages in the process 400 include: (1) robust feature point tracking with large head movement compensation based on scale-invariant head tracking; (2) model-based head pose estimation with sparse optical flow; (3) model-based head pose estimation with reference frames; (4) head pose estimation result integrated with Kalman filtering.

Based on the head position and size information obtained in FIG. 2, the process 400 starts with detected position and size obtained from 204 of FIG. 2 or 304 of FIG. 3 to be shown at 401 to generate a head tracking region. Using a multi-scale searching scheme enabled by scale-invariant head appearance descriptor, the generation of the head tracking region is efficient under lager and fast translation motion.

Subsequently, the head tracker defines the region of interest at two successive frames both for optical flow based feature tracking and for SURF based feature tracking with reference frames. The optical flow based feature tracking and head pose estimation start with corner extraction at 402 within the region of interest at a frame t−1 and at the frame t. The resulting feature points are recorded at 403 and 404 respectively.

In one embodiment, the Kanade-Lucas-Tomasi (KLT) algorithm in computer vision is used to detect corner feature points, and the optical flow equation is used as a method for matching the corners at 405. The matched KLT feature pairs are summarized at 406 in which the estimated head pose from the frame t−1 provides an initial head pose for the model-based head pose estimation at 411.

The optical flow based feature tracking gives an accurate short term feature tracking capability. However, the tracking errors may be accumulated for the pose estimation with a long input image sequence.

In one embodiment, SURF (SpeedUp Robust Features) features are used in the reference frames to perform a relative long term feature tracking to reduce the accumulation of the possible errors. Given the tracked head position and size at time t, defined as a region of interest, the SURF feature extraction is performed at 407, and the extracted SURF features are recorded at 408.

During the head pose estimation, a set of reference frames are generated in an online manner. Each reference frame includes two pieces of information: head pose and its corresponding SURF features. All of the reference frames are recorded in a central place (e.g., a memory commonly accessible) at 416. The SURF feature matching at 409 between 408 and 416 using the SURF feature description is performed to find the reference frame which has the most number of matched SURF features. The matched SURF feature information is recorded at 410 in which the estimated head pose from the reference frame provides an initial head pose for the model-based head pose estimation at 411.

Given the matched feature points and initial pose information at 406 and 410, the model based head pose estimation at 411 is a non-linear optimization process according to one embodiment. The model based head pose estimation at 411 is to minimize the sum of squared distances between the detected facial features at the frame t and projected model vertices obtained from ray-model intersection.

For the matched feature points stored at 406, the model vertices are obtained by back-projecting the feature points in the image frame at t−1 and performing the ray-model intersection, where the 3D head model is transformed based on the initial pose estimated at frame t−1 (do not understand).

For matched feature points at 410, the mode vertices are obtained by back-projecting the feature points in the reference frame, and performing ray-model intersection where 3D head model is transformed based on the initial pose estimated at the reference frame. (do not understand).

To minimize the sum of squared distances between the detected facial features at the frame t and projected model vertices obtained from the ray-model intersection, in one embodiment, the analytical Jacobian in Gaussian-Newton iteration which has a second order convergence rate for the model-based head pose estimation is utilized. The model-based head pose estimation method converges in about 10 iterations where the feature point residual errors are less than 2 pixels.

In operation, the sum of squared residual errors is firstly used as a criterion to reject the estimation that does not converge. For the converged head pose estimation, the sum of squared residual errors is further used to estimate the pose estimation covariance based on the classic adjustment computations.

Given the estimated head model poses and their accuracies represented by the corresponding covariance matrices provided as an example at 412, Kalman filtering is utilized to integrate the head estimation results both from the optical flow based feature tracking and the SURF feature tracking.

After Kalman filtering, the optimal head pose estimation for head model at image frame t, t−1, and corresponding reference frame is obtained. This is followed by updating the reference frame at 415. There are at least two kinds of reference frame updating operations. In one operation scenario, after estimating the current frame pose, the pose is inserted into the reference frames if it is the only frame in its representative pose region. In the second operation scenario, an existing reference frame is replaced with the current estimation if the estimated pose in the current frame is close to an existing reference frame, and the current estimation has a higher accuracy than the existing reference frame.

Figure 5B:
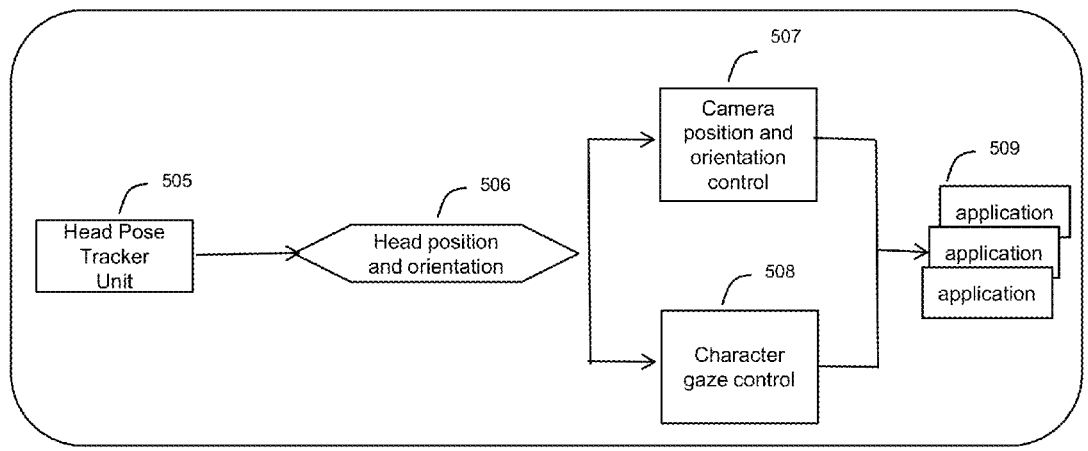
FIG. 5B shows a functional diagram in which 3D head tracking is used to control a 3D camera and/or virtual character gaze.

Along with the updated reference frames, the estimated head pose information after Kalman filtering is exported at 416 to FIG. 5A and FIG. 5B to achieve immersive experience for various game applications. One of the major features, advantages and benefits in the invention is to provide a natural and intuitive motion control interface for a user to facilitate the estimated 3D head motion and to enhance the immersive experience for various game applications.

Referring now to FIG. 5A, it shows a functional diagram 500 in an application scenario in which a scale-invariance head tracker according to one embodiment is used in conjunction with one or more applications. The scale-invariance head tracker unit 501 generates the tracked head position and size that is stored in a space 502. The tracked head position is mapped to a game application's 2D camera position, and the tracked head size is mapped to a game application's camera depth through camera position control unit 503.

In one embodiment, the camera position control unit 503 may employ a linear mapping function which maps the tracked head position and size to the camera position in its local XY dimension and local camera depth respectively. An end user then chooses the appropriate scaling coefficients in the linear mapping function to exaggerate or diminish the head movement so as to achieve a natural way to control the camera motion for immersive experiences.

The camera position control unit 503 is just one of examples of which an end user could take advantage of the provided information in three degrees of freedom exported from the scale-invariant head tracker 501. Without loss of generality, the information in three degrees of freedom could be mapped to any continuous control schemes in various applications.

Not only could the tracked head position and size be useful for controlling a camera as well as other devices, but also they provide extra degrees of freedom for a number of traditional game applications. For example, in a sword fighting game, an end user has both of his or her hands holding one or two controllers to control two weapons. In such a scenario, the camera position controlled by the head tracking results is an ideal and natural solution to allow the end user to look around in the virtual scene without interrupting his or her existing control schemes. The tracked head position and size also provide the trajectory data for head gesture recognition such as head nod for yes and head shake for no, and so on.

FIG. 5B shows an exemplary functional diagram 510 for an application scenario in which the 3D head pose tracker 505 is configured to generate the 3D head position and orientation 506, and provides immersive experience through authentic 3D camera control and character gaze control with the tracked head poses.

In the application example of Camera position and orientation control 507, it uses an end user's estimated six degrees of freedom head motion, without using any marker and wearing any intrusive device, to control the virtual camera motion through a true one-to-one mapping function. It provides a natural and immersive interface for an end user to control a virtual camera with his or her head movement so that the camera control becomes simple and intuitive.

Furthermore, this camera position and orientation control scheme with natural head movement does not interrupt the existing control schemes. As a result, it naturally provides a new add-on control scheme to the existing ones.

In the application example of character gaze control 508, it uses an end user's estimated 3D head position to control a virtual character's eye gaze direction so that an end user feels that the virtual character focuses its attention on him or her. Such focus of attention greatly improves the interaction between an end user and the virtual world presented by the application 509.

One aspect of the present invention is to provide a model-based head pose estimation technique that is fully automatic for interactive game applications. According to one embodiment, both translation and rotation are to be estimated even for fast head translational motion by integrating the head pose estimation with scale-invariant head tracking method developed for game applications. According to another embodiment, an optimization-based head pose estimation method is developed based on the correspondences between facial features detected from an image and facial features obtained from a 3D head model. Analytical Jacobian is used to speed up the pose estimation computations, and residual errors are used to confirm the convergence of the optimization.

As described above, one embodiment of the present invention is capable of estimating and tracking 3D head poses accurately without using any markers and wearing any special device. The estimation results are sufficient even for large and fast head motions. The disclosed head pose estimation and tracking method is applicable to various game applications including naturally controlling game camera and virtual character gaze, thus providing an immersive game experience.

Different embodiments of the present inventions have been described above. One skilled in the art will recognize that elements of the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier waves. The computer-readable media can also be distributed over network-coupled computer systems so that the computer-readable code is stored and executed in a distributed fashion.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A method for determining motion of a head, the method comprising:
    generating a sequence of images from a camera looking at a user;
    estimating a position and a size of a head of the user in each of the images using a scale-invariant head tracking technique designed to scan the each of the images at all scales; and
    determining pose of the head from the position and size of the head, wherein said determining pose of the head from the position and size of the head uses non-linear optimization to minimize a sum of squared distances between tracked facial features and projected corresponding features obtained from a 3D head model.

2. The method as recited in claim 1, wherein said estimating a position and a size of the head in each of the images using a scale-invariant head tracking technique comprises:
    tracking in each of the images to determine whether the head is present or not in the each of the images;
    defining a region of interest when the head is detected in the each of the images;
    locating the position of the head in the region of interest; and
    measuring the size of the head in the region of interest.

3. The method as recited in claim 2, wherein said tracking in each of the images comprises:
tracking the head under partial occlusion;
tracking the head with surrounded with other heads without being distracted; or
tracking a temporarily occluded head.

4. The method as recited in claim 3, wherein a color histogram and a gradient histogram are computed for the each of the images to facilitate the tracking of the head.

5. The method as recited in claim 2, wherein said tracking in each of the images is performed on multiple scales of the one of the images without degrading tracking results.

6. The method as recited in claim 2, further comprising:
detecting the head in the region of interest;
checking a position and a size of the head in the region of interest; and
updating the position and size of the head obtained from said estimating a position and a size of a head of the user in each of the images when the position and the size of the head in the region of interest are so different from the position and size of the head previously obtained.

7. The method as recited in claim 1, wherein analytical Jacobian computation is utilized to speed up the non-linear optimization with second-order Gaussian-Newton method, and use residual errors to confirm convergence of the non-linear optimization.

8. The method as recited in claim 1, wherein the position of the head and the size of the head in the region of interest are further provided to a head pose initialization unit to get frontal facial features of the head or a head pose tracker unit to define the region of interest.

9. The method as recited in claim 8, wherein the frontal facial features include eye centers, nose, and mouth corners of the head, and the head pose tracker unit works with large and fast translation movements of the head.

10. The method as recited in claim 8, wherein the head pose tracker defines the region of interest at two successive frames.

11. The method as recited in claim 10, wherein the head pose tracker utilizes an optical flow based feature tracking and Speeded up robust features (SURF) based feature tracking with reference frames.

12. The method as recited in claim 11, wherein the optical flow based feature tracking and Speeded up robust features (SURF) based feature tracking compensate each other to facilitate better pose estimation of the head in the images.

13. The method as recited in claim 12, wherein the pose estimation is based on a generic model provided to be imposed with detected facial features from the images.

14. The method as recited in claim 12, wherein the pose estimation is performed by minimizing a sum of squared distances between detected facial features and projected model vertices.

15. The method as recited in claim 10, wherein the head pose tracker possesses features of feature point tracking with large head movement compensation based on scale-invariant head tracking, model-based head pose estimation with sparse optical flow, model-based head pose estimation with reference frames, and head pose estimation result integrated with Kalman filtering.

16. The method as recited in claim 1, wherein the pose of the head provides a natural and intuitive motion control interface to control one or more objects in a virtual environment.

17. The method as recited in claim 16, wherein the virtual environment is part of a video game being displayed on a display unit.

18. A device for determining motion of a head, the device comprising:

an interface, coupled to a camera, to receive a sequence of images from the camera disposed to look at a user;
a memory space for storing code;
a processor, coupled to the memory space, executing the code to perform operations of:
estimating a position and a size of a head of the user in each of the images using a scale-invariant head tracking technique designed to scan the each of the images at all scales; and
determining pose of the head from the position and size of the head, wherein said determining pose of the head from the position and size of the head uses non-linear optimization to minimize a sum of squared distances between tracked facial features and projected corresponding feature obtained from a 3D head model.

19. The device as recited in claim 18, wherein said estimating a position and a size of the head in each of the images using a scale-invariant head tracking technique comprises:
tracking in each of the images to determine whether there is a head or not in the each of the images;
defining a region of interest when the head is detected in the each of the images;
locating the position of the head in the region of interest; and
measuring the size of the head in the region of interest.

20. The device as recited in claim 19, wherein said tracking in each of the images comprises:
tracking the head under partial occlusion;
tracking the head with surrounding other heads without being distracted; or
tracking a temporarily occluded head.

21. The device as recited in claim 20, wherein a color histogram and a gradient histogram are computed for the each of the images to facilitate the tracking of the head.

22. The device as recited in claim 19, wherein said tracking in each of the images is performed on multiple scales of the one of the images without degrading tracking results.

23. The device as recited in claim 18, wherein the operations further comprises:
detecting the head in the region of interest;
checking a position and a size of the head in the region of interest; and
updating the position and size of the head obtained from said estimating a position and a size of a head of the user in each of the images when the position and the size of the head in the region of interest are so different from the position and size of the head previously obtained.

24. The device as recited in claim 18, wherein analytical Jacobian computation is utilized to speed up the non-linear optimization with second-order Gaussian-Newton device, and use residual errors to confirm convergence of the non-linear optimization.

25. The device as recited in claim 18, wherein the position of the head and the size of the head in the region of interest are further provided to a head pose initialization unit to get frontal facial features of the head or a head pose tracker unit to define the region of interest.

26. The device as recited in claim 25, wherein the frontal facial features include eye centers, nose, and mouth corners of the head, and the head pose tracker unit works with large and fast translation movements of the head.

27. The device as recited in claim 25, wherein the head pose tracker defines the region of interest at two successive frames.

28. The device as recited in claim 27, wherein the head pose tracker utilizes an optical flow based feature tracking and Speeded up robust features (SURF) based feature tracking with reference frames.

29. The device as recited in claim 28, wherein the optical flow based feature tracking and Speeded up robust features (SURF) based feature tracking compensate each other to facilitate better pose estimation of the head in the images.

30. The device as recited in claim 29, wherein the pose estimation is based on a generic model provided to be imposed with detected facial features from the images.

31. The device as recited in claim 29, wherein the pose estimation is performed by minimizing a sum of squared distances between detected facial features and projected model vertices.

32. The device as recited in claim 27, wherein the head pose tracker possesses features of feature point tracking with large head movement compensation based on scale-invariant head tracking, model-based head pose estimation with sparse optical flow, model-based head pose estimation with reference frames, and head pose estimation result integrated with Kalman filtering.

33. The device as recited in claim 18, wherein the pose of the head provides a natural and intuitive motion control interface to control one or more objects in a virtual environment.

34. The device as recited in claim 33, wherein the virtual environment is part of a video game being displayed on a display unit.

* * * * *